United States Patent [19]
Ishigami et al.

[11] 3,944,293
[45] Mar. 16, 1976

[54] HYDRAULIC BRAKE CONTROL ASSEMBLY

[75] Inventors: Noriakira Ishigami, Chiryu; Hideyuki Kobayashi, Toyota, both of Japan

[73] Assignee: Aisin Seiki Kabushiki Kaisha, Japan

[22] Filed: Nov. 25, 1974

[21] Appl. No.: 527,078

[30] Foreign Application Priority Data
Nov. 23, 1973 Japan............................ 48-132035

[52] U.S. Cl............................. 303/24 F; 303/6 C
[51] Int. Cl.²............................................ B60T 8/14
[58] Field of Search............. 303/6 C, 22 R, 24

[56] References Cited
UNITED STATES PATENTS
2,924,306   2/1960   Martin........................... 303/24 F X
3,476,443   11/1969   Bratten et al. ................. 303/24 C FOREIGN PATENTS OR APPLICATIONS
936,495   9/1963   United Kingdom ............... 303/24 F

*Primary Examiner*—Duane A. Reger
*Attorney, Agent, or Firm*—Oblon, Fisher, Spivak, McClelland & Maier

[57] ABSTRACT

A hydraulic brake pressure control assembly for use in an automotive vehicle includes a proportioning valve for rear wheel brake means. The starting point of actuation of the proportioning valve is varied according to the condition of loading of the vehicle. A slidable member of an enlarged pressure receiving area is provided to act on the proportioning valve, a check valve is provided to admit the hydraulic pressure to the slidable member after its predetermined value, and an inertia-responsive ball is provided for controlling admission of the hydraulic pressure according to the vehicle deceleration.

9 Claims, 4 Drawing Figures

HYDRAULIC BRAKE CONTROL ASSEMBLY

BACKGROUND OF THE INVENTION

1. Field of the Invention

This invention relates to a hydraulic brake control assembly for automotive vehicles, and more particularly to a brake pressure control assembly responsive to vehicle deceleration.

2. Description of the Prior Art

Generally, it is well known that vehicle deceleration is proportional to the hydraulic brake pressure and that the hydraulic brake pressure, in order to obtain a certain deceleration, is varied according to the loading conditions of the vehicle, i.e., the brake pressure necessary to obtain a certain deceleration at the minimum vehicle load is smaller than the brake pressure necessary to obtain the deceleration at the maximum vehicle load. That is to say as the vehicle load increases the hydraulic pressure necessary for braking must also increase.

In addition, it is also well known that it is desirable to actuate a proportioning valve in accordance with the vehicle loading, i.e., it is desirable to actuate the proportioning valve at the greater hydraulic pressure when the vehicle load is large than when the vehicle load is small. That is to say, as the vehicle load increases the hydraulic pressure suitable for actuating the proportioning valve must also increase.

There have been proposed various means to utilize a hydraulic pressure value for obtaining the starting point of actuation of the proportioning valve i.e., the deflecting point corresponding to the hydraulic pressure value for obtaining a certain vehicle deceleration. However, it should be noted that merely sensing of the vehicle deceleration is insufficient because the variance in the deflecting point of the proportioning valve is of too small a range to actuate the proportioning valve. Therefore, conventional means have not been completely satisfactory for accomplishing the primary purpose since they have been too complicated in structure or not reliable in operation.

SUMMARY OF THE INVENTION

Accordingly, it is an object of this invention to provide an improved hydraulic brake control assembly wherein the conventional difficulties are overcome.

Another object of this invention is to provide an improved hydraulic brake control assembly wherein the hydraulic pressure variance to obtain the proper deflecting point of a proportioning valve is of an enlarged range thereby obtaining desirable hydraulic pressure characteristics.

A further object of this invention is to provide an improved hydraulic brake control assembly wherein the design thereof is simplified by utilizing a check valve.

Yet another object of this invention is to provide an improved hydraulic brake control assembly wherein the operation of a proportioning valve becomes ineffective when the front wheel brake means are damaged or if leakage occurs.

A still further object of this invention is to provide an improved hydraulic brake control assembly which is simple in construction, inexpensive in manufacture, and reliable in operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
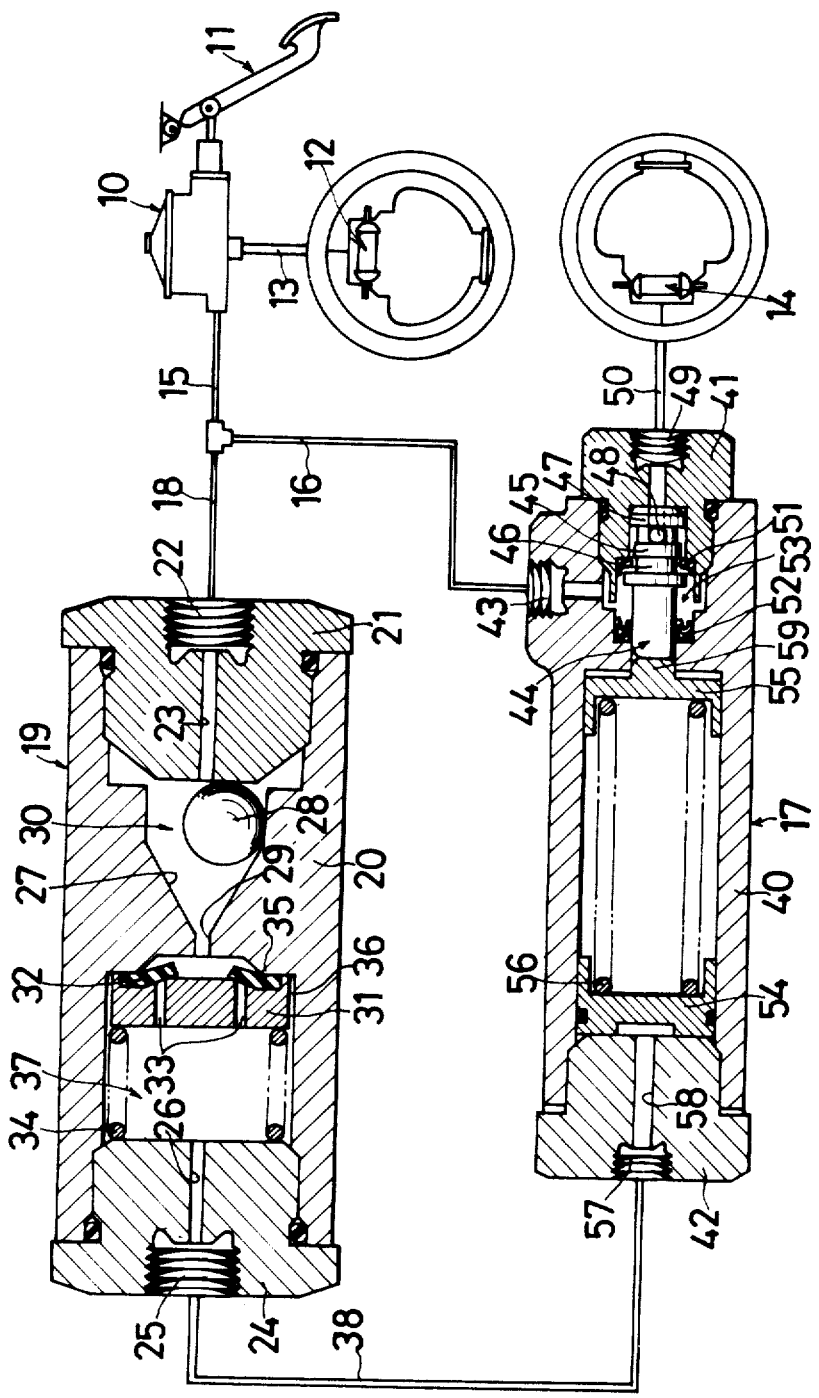
FIG. 1 is a cross-sectional view partly schematic of the system of the invention.

Referring now to the drawings, and especially to FIG. 1 thereof, wherein there is shown a conventional tandem master cylinder to be operated by a brake pedal 11 such that pressurized fluid is applied to front wheel brake means 12 via a conduit 13 and to rear wheel brake means 14 via a conduit 15 and a branch conduit 16. The hydraulic pressure in the branch conduit 16 is admitted to a brake pressure control device 17 while the hydraulic pressure in the branch conduit 18 of the conduit 15 is admitted to a hydraulic pressure sensing device 19.

The pressure sensing device 19 includes a housing having both ends open, a first plug 21 sealingly attached to one of the open ends of the housing 20 and provided with an inlet 22 and an axial passage 23, and a second plug 24 sealingly attached to the other end of the housing 20 and provided with an outlet 25 and an axial passage 26. The housing 20 includes at its inner wall a sloped portion 27, a ball 28 acting as an inertia responsive valve, and a valve passage 29 thereby constituting a so-called G-valve assembly 30. The ball 28 will roll to climb the sloped wall 27 thereby closing the valve passage 29 when vehicle deceleration of a predetermined value is applied regardless of the condition of loading of the vehicle. Within the housing 20 are provided a check valve body 31 provided with a valve member 32 made of rubber material and a passage means 33, and a spring 34 disposed between the second plug 24 and the check valve body 31 for normally urging the latter to the right as viewed in FIG. 1. The valve member 32 is seated on a seat shoulder 35 of the housing 20 when the hydraulic pressure applied through the central passage 29 is smaller than the urging force of the spring 34 thereby interrupting fluid communication between the valve passage 29 and the outlet 25. Any hydraulic pressure from the outlet 25 to the valve passage 29 is, however, free to pass through the passage means 33 and the valve member 32. When the hydraulic pressure from the inlet 22 is great enough to overcome the force of spring 34, such pressure will be admitted to the outlet 25 through an annular gap 36 formed between the valve body 31 and the housing 20. Thus, a check valve assembly 37 is constituted in the housing 20.

The brake pressure control device 17 includes a housing 40 having both ends open, a first plug 41 sealingly fitted to one open end of the housing 40, and a second plug 42 sealingly fitted to the other open end thereof. The housing 40 is provided with a first inlet 43 fluidically connected to the branch conduit 16. Within the first plug 41 is movably mounted a piston 44 having an enlarged portion 45, a reduced portion 46, and a head 47. An opening 48 is provided on the piston 44 between the enlarged portion 45 and the head portion 47 to communicate with an outlet 49 of the first plug 41 which is in turn connected to the rear brake means 14 via conduit 50. An annular seal member 51 is fixed to the inside wall of the first plug 41 to cooperate with the enlarged portion 45 of the piston 44. A sealing cup 52 is provided for sealingly guiding and supporting the piston 44. A proportioning valve 53 is thus constituted.

Within the housing 40 are slidably fitted a first guide piston 54 and a second guide piston 55 which are normally urged to move in opposite directions by a spring 56 interposed therebetween. The movement of first guide piston 54 is limited by the second plug 42 having a second inlet 57 and an axial passage 58. The outlet 25 of the pressure sensing device 19 is fluidically connected to the second inlet 57 of the brake pressure control device 17 via conduit 38. The second guide piston 55 has a projection 59 of the same diameter as the proportioning valve piston 44 and normally makes contact therewith thereby urging the piston 44 to move to the right (FIG. 1) with a preload of the spring 56.

In operation, when the brake pedal 11 is depressed hydraulic pressure is generated in the master cylinder 10 and is supplied to the conduits 13 and 15. The pressure in the conduit 13 is transmitted to the front brake means 12 while the pressure in the conduit 15 is transmitted to the pressure sensing device 19 and the brake pressure control device 17. The rear brake means 14 is supplied with hydraulic pressure through the proportioning valve 53 of the brake pressure control device 17. More specifically, the pressurized fluid admitted to the first inlet 43 of housing 40 is supplied to the annular gap between the sealing member 51 and the reduced portion 46 of piston 44, the passage 48 thereof, the chamber between the head portion 47 of piston 44 and the inner wall shoulder of housing 40, the outlet 49, the conduit 50, and the rear brake means 14 before the hydraulic pressure generated in the master cylinder 10 reaches its predetermined value. Therefore, the characteristics of the hydraulic pressure may be represented by the line $P_0 - P_1$ in FIG. 2.

When the hydraulic pressure reaches its predetermined value $P_1$ the piston 44 is urged to move to the left against the spring 56 (FIG. 1) due to the increased hydraulic pressure in the chamber between the piston head 47 and the housing 40 such that the enlarged portion 45 of piston 44 is sealingly engaged with the sealing member 51. Thus, the hydraulic pressure in the rear brake means 14 is reduced with respect to the hydraulic pressure in the master cylinder 10. The successively increasing pressure in the master cylinder 10 is applied to the annular portion of the enlarged piston portion 45 and the piston 44 is moved to the right thereby reestablishing fluid communication between the master cylinder 10 and the rear brake means 14, as is shown by the line $P_1 - P_2$ in FIG. 2.

Figure 2:
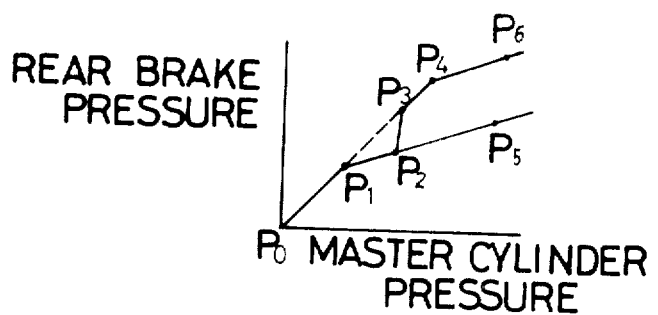
FIGS. 2 and 3 are graphical representations of the hydraulic pressure of the valve means show in FIG. 1.

It will be apparent that the deflecting point, such for example as $P_1$ or $P_4$ in FIG. 2, may be variably set by changing the exerting force of the spring 56. This invention provides a simple means for changing the exerting force of the spring 56, as is explained hereinbelow.

Figure 3:
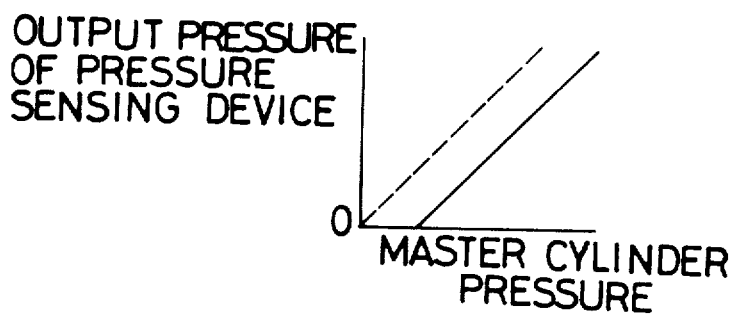

The hydraulic pressure admitted to the inlet 22 of the pressure sensing device 19 is transmitted to the G valve assembly 30 via passage 23 and then to the valve passage 29. When the hydraulic pressure applied to the check valve body 31 is less than the biasing force of the spring 34, no hydraulic pressure is admitted to the outlet 25. However, when the hydraulic pressure applied to the check valve body 31 is greater than the biasing force of the spring 34, the check valve body 31 is moved to the left against the spring 34. The valve member 32 is thus released from the shoulder 35, and the pressurized fluid is admitted to the annular gap 36, the axial passage 26, the outlet 25, the conduit 38, and to the second inlet 57 of the pressure control device 17. The characteristics of the hydraulic pressure admitted at the second inlet 57 of the pressure control device 17 are shown by solid line in FIG. 3. Unless the spring 34 of check valve assembly 37 is provided, the said characteristics would be as shown by dotted line in FIG. 3. When the hydraulic pressure applied to the first guide piston 54 is less than the urging force of spring 56, the first guide piston 54 is not moved such that the deflecting point $P_1$ is set only by the spring 56.

It is to be noted that if the same hydraulic pressure is applied for braking, a relatively great deceleration is achieved when the vehicle is of little load while a relatively small deceleration is achieved when the vehicle is of a much larger load. In other words, when the vehicle is of little load, a relatively small pressure is sufficient to close the valve passage 29 by the ball 28 while when the vehicle is of a much larger load, a relatively greater pressure is required to close the valve passage 29. Therefore, when the valve passage 29 is closed by the inertia-responsive ball 28 under little load of the vehicle, a relatively small pressure is applied to the first guide piston 54 of brake control device 17, while when the valve passage 29 is closed under a much larger load of the vehicle, a relatively greater pressure is applied to the first guide piston 54.

It is to be further noted that when a vehicle is in a steady state condition, the hydraulic pressure for generating a certain deceleration in various loading conditions is fixed and the hydraulic pressure for the ideal deflecting points in various loading conditions is also fixed. The value of each hydraulic pressure is usually different such that it is necessary to adjust the hydraulic pressure for the certain deceleration to the hydraulic pressure for the ideal deflecting points. The present invention provides the first guide piston 54 of an area receiving the hydraulic pressure from the check valve assembly 37, said area being of a certain ratio to the area of the proportioning valve piston 44. That is to say, the pressure receiving area of the first guide piston 54 is set with an increased ratio to the area of the piston 44 around the sealing cup 52 such that the hydraulic pressure for the certain deceleration in the various loading conditions is changed to the hydraulic pressure for the desirable deflecting points under the various loading conditions. Accordingly, the hydraulic pressure acting on the first guide piston 54 and the spring 56 may set the deflecting point of hydraulic pressure suitable for each loading condition of the vehicle. Thus, the deflecting point $P_4$ of hydraulic pressure at the maximum vehicle load is set above the deflecting point $P_1$ at the minimum vehicle load, as is seen in FIG. 2.

Assuming that a certain deceleration is set as 0.3G, the hydraulic pressure for obtaining 0.3G at the minimum load and at the maximum load is also fixed, for instance, as 20 kg/cm² and 40 kg/cm², respectively. The hydraulic pressure of the desirable deflecting point at the minimum load and at the maximum load is set, for instance, as 10 kg/cm², and 50 kg/cm², respectively.

Assuming that the urging force of the spring 34 is $x$ and the ratio of the area of guide piston 54 to the area of valve piston 44 is $y$, the following formula may be set:

$(20 \text{ kg/cm}^2 \text{-} x) y = 10 \text{ kg/cm}^2$
$(40 \text{ kg/cm}^2 \text{-} x) y = 50 \text{ kg/cm}^2$ As will be apparent, $x$ is 15 kg/cm² and $y$ is 2. This means that when the pressure receiving area of the first guide piston 54 is made two times greater than the area of the valve piston 44 around the sealing cup 52 and the biasing force of the spring 34 is set as 15 kg/cm², the object of this invention can be realized. The ratio of the guide piston area to the valve piston area may be modified suitably for each vehicle. Although the strength of spring 34 may be suitably changed, it is preferable in the view of manufacture to change the area of the guide piston 54. It should be recognized that the spring 34 is provided for decreasing the hydraulic pressure at the guide piston 54 with respect to the hydraulic pressure at the master cylinder 10 and the enlarged area of the guide piston 54 with respect to the area of the valve piston 44 is provided for increasing the urging force of spring 56.

Referring to FIG. 2 for summary of the operation, when the hydraulic pressure at the second inlet 57 is low and the spring 56 is not compressed, the deflecting point $P_1$ of proportioning valve 53 is set only by the exerting force of spring 56. At this time, if the vehicle is under a low load, the valve ball 28 closes the valve passage 29 at Point $P_2$ and the characteristics of hydraulic pressure at the outlet 49 is shown by line $P_1 - P_2 - P_5$. If the vehicle is under a high load, the increased hydraulic pressure is successively applied at the second inlet 57 and the spring 56 is compressed due to the slide movement of first guide piston 54. Therefore, the proportioning operation of the proportioning valve 53 is canceled, as shown by line $P_2 - P_3 - P_4$. The ball 28 then closes the passage 29 when a predetermined vehicle deceleration is applied and hydraulic pressure no longer increases at the inlet 57. The point $P_4$ shows the deflecting point of hydraulic pressure wherein the master cylinder pressure is balanced with the compressed or increased urging force of the spring 56 to accomplish the proportioning effect.

It will be understood that if the first guide piston 54 is designed to move initially by the increased hydraulic pressure at the inlet 57 before starting of the proportioning operation and then the ball 28 closes the valve passage 29 at the point $P_4$, the characteristics of brake pressure may be represented by line $P_0 - P_1 - P_3 - P_4 - P_6$. It is a matter of design of the first guide piston 54 whether the piston 54 in initially moved or not.

When the foot pedal 11 is released, the hydraulic pressure in the front and rear brake means 12 and 14 is released. At this time the hydraulic pressure applied to the first guide piston 54 is returned to the master cylinder 10 through the conduit 58, the outlet 25, the axial passage 26, the passage means 33 of valve body 31, the valve member 32 being opened, and the valve passage 29. The ball valve 28 is thus returned to its original position.

It is apparent to those ordinarily skilled in the art from the foregoing that the housings 20 and 40 of pressure sensing device 19 and brake pressure control device 17 may be constructed integrally with each other or of one-piece of material.

Additionally, in the event that the front wheel brake means 12 should be broken or should leakage develop, the ball 28 is not moved to close the valve passage 29 since no deceleration is generated. Therefore, the highly increased hydraulic pressure is applied at the guide piston 54 such that the proportioning valve 53 is not actuated and any hydraulic pressure at the first inlet 43 of housing 40 is transmitted to the outlet 49 without proportioning or metaling effect.

Figure 4:
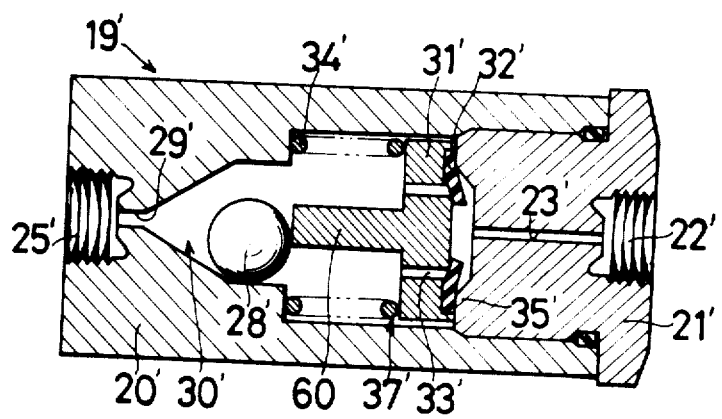
FIG. 4 is a cross-sectional view of another embodiment of the hydraulic pressure sensing device shown in FIG. 1.

Referring to FIG. 4, another embodiment of the pressure sensing device 19 is shown wherein the same element as in the previous embodiment is indicated by the same reference numberal with affix (′).

According to this embodiment, the hydraulic pressure admitted to an inlet 22′ is transmitted to a check valve assembly 37′ including a valve body 31′ and a valve member 32′ though an axial passage 23′ of a plug 21′. If the pressure is below the exerting force of a coiled spring 34′, no hydraulic pressure is supplied to a G valve assembly 30′ since the valve member 32′ is sealingly engaged with an inner shoulder 35′ of plug 21′.

When the hydraulic pressure at the inlet 22′ is above the predetermined value, the check valve assembly 37′ is moved to the left against the spring 34′ and the pressure at the inlet 22′ minus the biasing force of the spring 34′ is admitted at an outlet 25′ through the G valve assembly 30′. An axial projection 60 of the valve body 31′ will limit the falling or rolling of valve ball 28′ into the check valve assembly 37′.

The operation and features of the embodiment shown in FIG. 4 is the same as the foregoing embodiment, so the detailed explanation thereof may be omitted.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hydraulic brake control assembly for automotive vehicles having front and rear wheel brake means, comprising:
   a dual master cylinder;
   a proportioning valve interposed between said master cylinder and one of said wheel brake means and including a reciprocable valve piston for effecting a proportioning operation, said valve piston having an area free from the hydraulic pressure of said master cylinder,
   a first device having a first piston and a first spring normally urging said valve piston to move to a position wherein hydraulic pressure in said master cylinder is admitted to said one of said wheel brake means without said proportioning operation of said valve,
   a second device fluidically interposed between said master cylinder and said first piston of said first device and including a vehicle deceleration sensing assembly and a check valve assembly, said vehicle deceleration sensing assembly controlling admission of the hydraulic pressure from said master cylinder to said first piston according to the condition of loading of the vehicle, said check valve assembly controlling said admission of the hydraulic pressure according to an increase of hydraulic power,
said first piston of said first device being supplied with hydraulic pressure to thereby urge said valve piston to move to said position in addition to said first spring, wherein the pressure receiving area of said first piston is of an increased ratio to said area of said valve piston whereby the hydraulic pressure admitted from said second device to said first piston acts on said valve piston with an increased ratio,
whereby said proportioning valve operates its proportioning operation in accordance with the condition of loading of the vehicle.

2. A hydraulic brake control assembly of claim 1, wherein said first device comprises a second piston interposed between said first piston and said valve piston, said second piston including a projection normally in contact with said valve piston.

3. A hydraulic brake control assembly of claim 2, wherein said first device and said proportioning valve are located within a single housing and said projection of said second piston is coaxially fitted with said valve piston.

4. A hydraulic brake control assembly of claim 3, wherein said second device comprises a housing, said housing including an inlet connected to said master cylinder, an outlet connected to said first piston of said first device, and a central passage between said inlet and said outlet.

5. A hyrdaulic brake control assembly of claim 4, wherein said vehicle deceleration sensing assembly includes an inertia-responsive ball cooperative with said central passage and said check valve assembly includes a slidable valve and a second spring urging said slidable valve to move in a direction wherein said inlet is fluidically communicable with said outlet only when the hydraulic pressure overcomes said second spring, said ball closing said central passage upon application of a predetermined vehicle deceleration.

6. A hydraulic brake control assembly of claim 5, wherein said ball is located between said inlet and said central passage and said slidable valve is located between said central passage and said outlet.

7. A hydraulic brake control assembly of claim 5, wherein said slidable valve is located between said inlet and said ball.

8. A hydraulic brake control assembly of claim 1, wherein said one of said front and rear wheel brake means is said rear wheel brake means and said front wheel brake means is directly connected to said master cylinder.

9. A hydraulic brake control assembly of claim 4, wherein said housing of said first device is made integrally with said housing of said second device.

* * * * *